(12) United States Patent
Waters

(10) Patent No.: US 10,158,826 B2
(45) Date of Patent: Dec. 18, 2018

(54) SYSTEM AND METHOD FOR RECORDING AND TRAINING ATHLETES FROM MULTIPLE POINTS OF VIEW

(71) Applicant: Reel Pro Motion, LLC, Dallas, TX (US)

(72) Inventor: Charlie Waters, Dallas, TX (US)

(73) Assignee: Reel Pro Motion, LLC, Coppell, TX (US)

(*) Notice: Subject to any disclaimer, the term of this patent is extended or adjusted under 35 U.S.C. 154(b) by 0 days.

(21) Appl. No.: 15/288,961

(22) Filed: Oct. 7, 2016

(65) Prior Publication Data

US 2017/0104956 A1    Apr. 13, 2017

Related U.S. Application Data

(60) Provisional application No. 62/238,695, filed on Oct. 7, 2015.

(51) Int. Cl.
| | |
|---|---|
| *H04N 5/91* | (2006.01) |
| *H04N 5/247* | (2006.01) |
| *H04N 5/232* | (2006.01) |
| *H04N 5/04* | (2006.01) |
| *H04N 5/77* | (2006.01) |

(Continued)

(52) U.S. Cl.
CPC ............. *H04N 5/91* (2013.01); *A63B 69/00* (2013.01); *A63B 69/002* (2013.01); *A63B 69/0002* (2013.01); *A63B 69/0026* (2013.01); *A63B 69/0071* (2013.01); *G09B 5/065* (2013.01); *G09B 19/0038* (2013.01);
(Continued)

(58) Field of Classification Search
None
See application file for complete search history.

(56) References Cited

U.S. PATENT DOCUMENTS

| | | |
|---|---|---|
| 8,228,372 B2 | 7/2012 | Griffin |
| 8,690,655 B2 | 4/2014 | Meyer et al. |

(Continued)

FOREIGN PATENT DOCUMENTS

EP    2716334 A1    9/2014

OTHER PUBLICATIONS

Feldman, Bruce, "Stanford Cardinal: An inside look at fottball's QB revolution," Fox Sports, Mar. 11, 2015, http://www.foxsports.com/college-football/story/stanford-cardinal-nfl-virtual-reality-qb-training-031115, 14 pp.

(Continued)

*Primary Examiner* — Eileen M Adams
(74) *Attorney, Agent, or Firm* — Daniel J. Chalker; Chalker Flores, LLP

(57) ABSTRACT

A system and method for recording and training athletes uses multiple points of view For example, a new football training video in which a stationary camera (75" high) replaces the player (QB). The smooth (not jerky GoPro) easy to see video provides an unobstructed POV from the sightline of the QB (CorneaCAM—"CC") during the execution of live play. For confirmation of visual fields and analyzing the intentions of the defensive team, there are two other cameras videoing the same play. The user will have the capability to view the play from either of the two other angles in real time, to better understand, interpret and confirm what he thinks he sees at the CorneaCAM POV. All three POV's have freeze frame and slow motion capability.

20 Claims, 16 Drawing Sheets

(51) Int. Cl.
　　　*G11B 27/10* (2006.01)
　　　*G11B 27/00* (2006.01)
　　　*A63B 69/00* (2006.01)
　　　*G09B 5/06* (2006.01)
　　　*G09B 19/00* (2006.01)

(52) U.S. Cl.
　　　CPC ............ *G11B 27/005* (2013.01); *G11B 27/10* (2013.01); *H04N 5/04* (2013.01); *H04N 5/23206* (2013.01); *H04N 5/23216* (2013.01); *H04N 5/23238* (2013.01); *H04N 5/23293* (2013.01); *H04N 5/247* (2013.01); *H04N 5/77* (2013.01); *A63B 2220/806* (2013.01); *A63B 2243/007* (2013.01)

(56) References Cited

U.S. PATENT DOCUMENTS

| | | |
|---|---|---|
| 2004/0104935 A1 | 6/2004 | Williamson et al. |
| 2009/0189982 A1* | 7/2009 | Tawiah ................... A63F 13/65 348/157 |
| 2011/0008761 A1 | 1/2011 | Hakopian et al. |
| 2014/0287391 A1* | 9/2014 | Krull ...................... A63B 69/00 434/247 |
| 2015/0380052 A1* | 12/2015 | Hamer ............. H04N 21/21805 386/241 |
| 2016/0015109 A1* | 1/2016 | Anwar .................. H04N 7/181 348/78 |

OTHER PUBLICATIONS

STRIVR Labs, Inc., Press Kit, undated, 5pp.
Rothstein, Michael, "Lions using ladder cam to help Stafford," ESPN Blog, Jun. 11, 2014, http://www.espn.com/blog/detroit-lions/post/_/id/8580/to-help-stafford-the-lions-using-ladder-cam, 4 pp.
Dreier, T., "ViewCast and BigLook360 Put Viewers on the Grammy Red Carpet," Feb. 8, 2013, StreamingMedia.com, http://www.streamingmedia.com/Articles/News/Online-Video-News/ViewCast-and-BigLook360-Put-Viewers-on-the-Grammy-Red-Carpet-87628.aspx, 3 pp.

* cited by examiner (POV #1)

(POV #1a)

(POV #2)

(POV #2a)

(POV #2b)

(POV #3)

SYSTEM AND METHOD FOR RECORDING AND TRAINING ATHLETES FROM MULTIPLE POINTS OF VIEW

CROSS-REFERENCE TO RELATED APPLICATIONS

This application is a non-provisional patent application of and claims priority to U.S. provisional patent application Ser. No. 62/238,695 filed on Oct. 7, 2015 and entitled "System and Method for Recording and Training Athletes from Multiple Points of View", the contents of which are hereby incorporated by reference in their entirety.

FIELD OF THE INVENTION

The present invention relates generally to the field of sports, and more particularly to a system and method for recording and training athletes from multiple points of view.

BACKGROUND OF THE INVENTION

Players presently learn through two-dimensional methods, such as chalkboards/whiteboards and along with video perched either in the end zone of every stadium or at the highest point at mid field, above the field of play.

SUMMARY OF THE INVENTION

A new football training video in which a stationary camera (e.g. 75" high) replaces the player (QB). The smooth (not jerky GoPro) easy to see video provides an unobstructed point of view ("POV") from the sightline of the QB (CorneaCAM—"CC") during the execution of live play. For confirmation of visual fields and analyzing the intentions of the defensive team, there are two other cameras videoing the same play. The user will have the capability to view the play from either of the two other angles in real time, to better understand, interpret and confirm what he thinks he sees at the CorneaCAM POV. All three POV's have freeze frame and slow motion capability.

One embodiment of this new teaching method is the player sees the exact POV that he will see on game day. Cornea Cam is not from above the stadium, nor on top of his helmet, nor on top of a 16' stepladder, set up behind the QB. This unique view is as if the Camera is the player. No known football teaching/coaching technique to date offers such experience and repetition, without the risk of injury. Though best utilized by the QB, this Coaching technique is applicable for other positions, i.e. Strong Safety and Free Safety.

Another embodiment of the present invention provides a sports recording system that includes: a first camera positioned approximately at any eye level of a player of interest at a sports venue representing a player point of view; a second camera positioned approximately above and behind the first camera representing an elevated player point of view; a third camera positioned approximately above and to a side of the sports venue representing a wide angle view of all players; a camera interface communicably coupled to the first camera, the second camera and the third camera; and a computer communicably coupled to the camera interface, the computer comprising a database, a memory, a monitor and a control interface communicably coupled to a processor. The processor receives a first video from the first camera, a second video from the second camera and a third video from the third camera via the camera interface, and records the first video, the second video and the third video onto a non-transitory recording media.

Another embodiment of the present invention provides a method of recording one or more sports plays at a sports venue by: capturing a first series of images of one or more sports plays at a sports venue using a first camera positioned approximately at an eye level of a player of interest such that the first series of images represents a player point of view; simultaneously capturing a second series of images of the one or more sports plays at the sports venue using a second camera positioned approximately above and behind the first camera such that the second series of images represents an elevated player point of view; simultaneously capturing a third series of images of the one or more sports plays at the sports venue using a third camera positioned approximately above and to a side of the sports venue such that the third series of images represents a wide angle view of all players involved with the one or more plays; transmitting the first series of images, the second series of images and the third series of images to a processor; synchronizing the first set of images, the second series of images and the third series of images using the processor; and recording the synchronized first set of images, second set of images and third set of images onto a non-transitory recording media using the processor.

Another embodiment of the present invention provides a method of training an athlete by: providing a video playback device, a controller communicably coupled to the video payback device and a display device communicably coupled to the video playback device; providing a non-transitory recording media readable by the video playback device, wherein the non-transitory recording media contains a first set of images of one or more sports plays at a sports venue from a first camera positioned approximately at an eye level of a player of interest such that the first series of images represents a player point of view, a second set of images of the one or more sports plays at the sports venue from a second camera positioned approximately above and behind the player of interest such that the second series of images represents an elevated player point of view, a third set of images of the one or more sports plays at the sports venue from a third camera positioned approximately above and to a side of the sports venue such that the third series of images represents a wide angle view of all players involved with the one or more plays, and the first set of images, the second set of images and the third set of images are synchronized with one another; selecting one of the sports plays using the controller; selecting the player point of view, the elevated player point of view, the wide angle view or a combination thereof using the controller; and training the athlete by providing the athlete with interactive control of the video playback device via the controller and displaying the selected view(s) of the selected sports play(s) on the display using the video playback device.

These and other objects, advantages and features of this invention will be apparent from the following description taken with reference to the accompanying drawing, wherein is shown a preferred embodiment of the invention.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Although the present invention will be described in reference to football, those skilled in the art will recognize that the present invention is applicable to other sports and not limited to football.

In football, the players work better both individually and as a unit when they are able to identify "keys"(positions, movement and/or the stance of one or more players of the other team) in the opposing team and react accordingly. For example, a quarterback might recognize a blitz or cover package based on these "keys" and make adjustments at the line of scrimmage. Similarly, defensive players can read the offense and make adjustments befor the ball is snapped.

For example, it is paramount for a defensive player to learn to key specific offensive players, each key changing with a new defense and offensive formation. To learn and train a player how to "key" specific offensive players for run or pass responsibility is a challenge. Offenses are adept at striving to trick a defense by showing one thing and actually doing another. This ploy is called a "false key". Everything that can be done to avoid a "false key" better enhances the production of the defense.

"Reel Coaching Video" in the mind's eye of the player provides this perspective and training. The original name of "CorneaCAM", which is just what it insinuates: It simulates camera mounted in the cornea of your eye. All it was, was what the player truly saw at field level, as if a camera was recording what the player focused on... it was what the palyer saw, and only what the player saw. Football video has always been filmed from an End Zone bird's eye view and/or a Wide Angle Sideline View. High above the level of play, as it shows the entire field and all can been seen. The more narrow world of CorneaCAM focuses specifically on what the player should be trained to look at. It is as though the player has blinders on to avoid distractions. Players could not be distracted by movement around their focal point and are trained to "stay with our key" until they believe it to be truthful. If the player's responsibility was to key the Tight End as to what his intentions were, then that was the only subject that filled the view of CorneaCAM, him and the immediate players around him. Many repetitions are required to develop this visual "muscle memory" so that the player maximizes performance.

Figure 4:
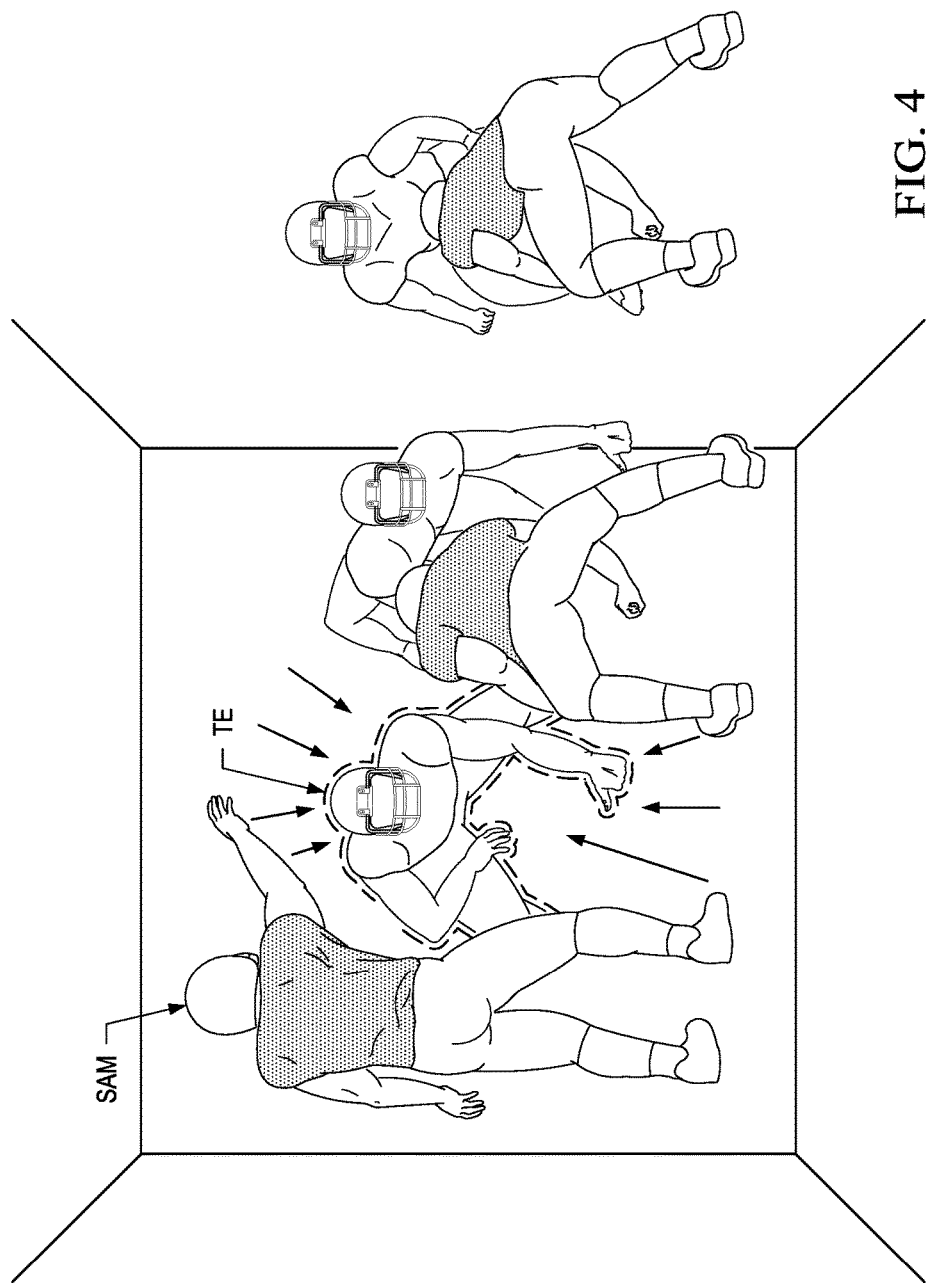
FIGS. 4-6 illustrate a key on a tight end (TE) in accordance with one embodiment of the present invention.
Figure 5:
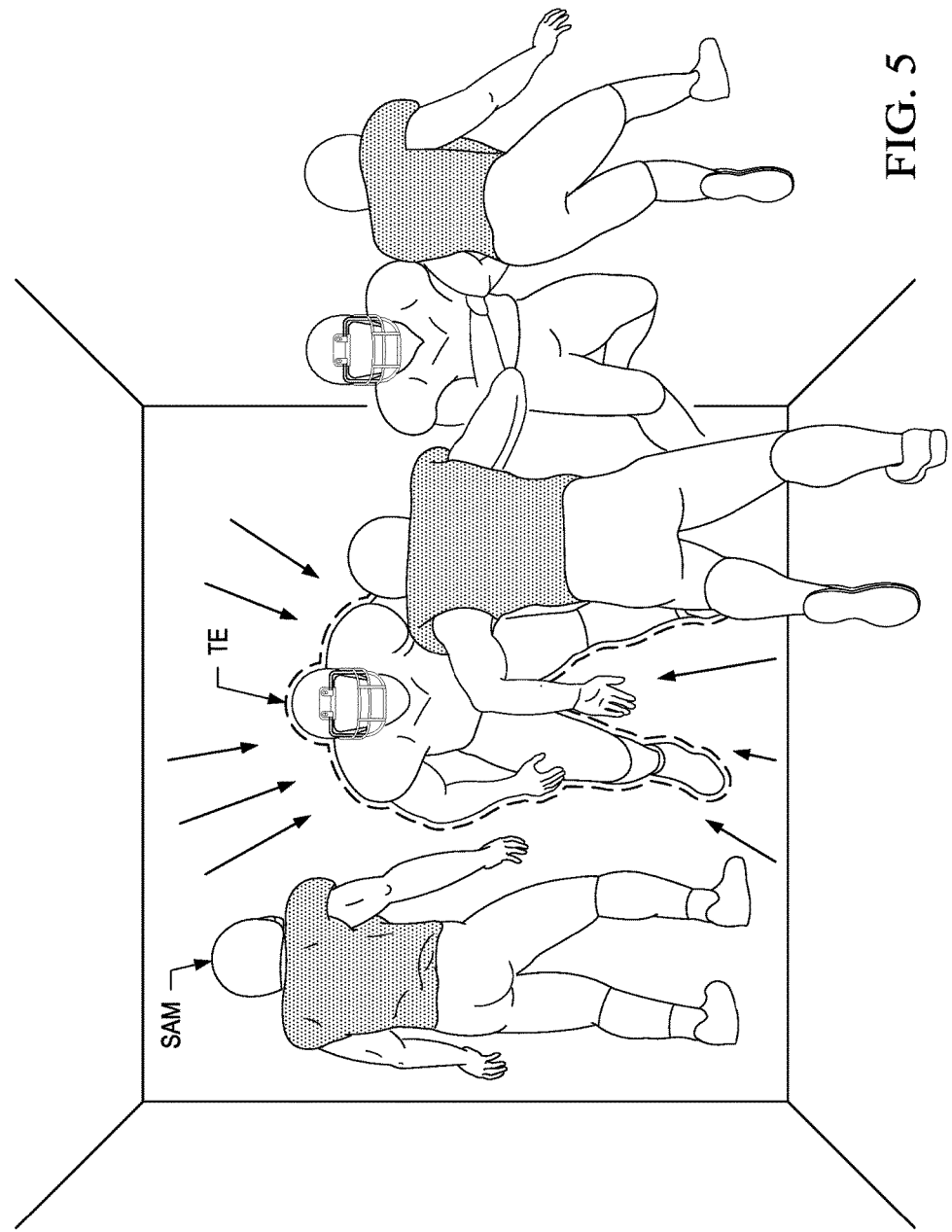
Figure 6:
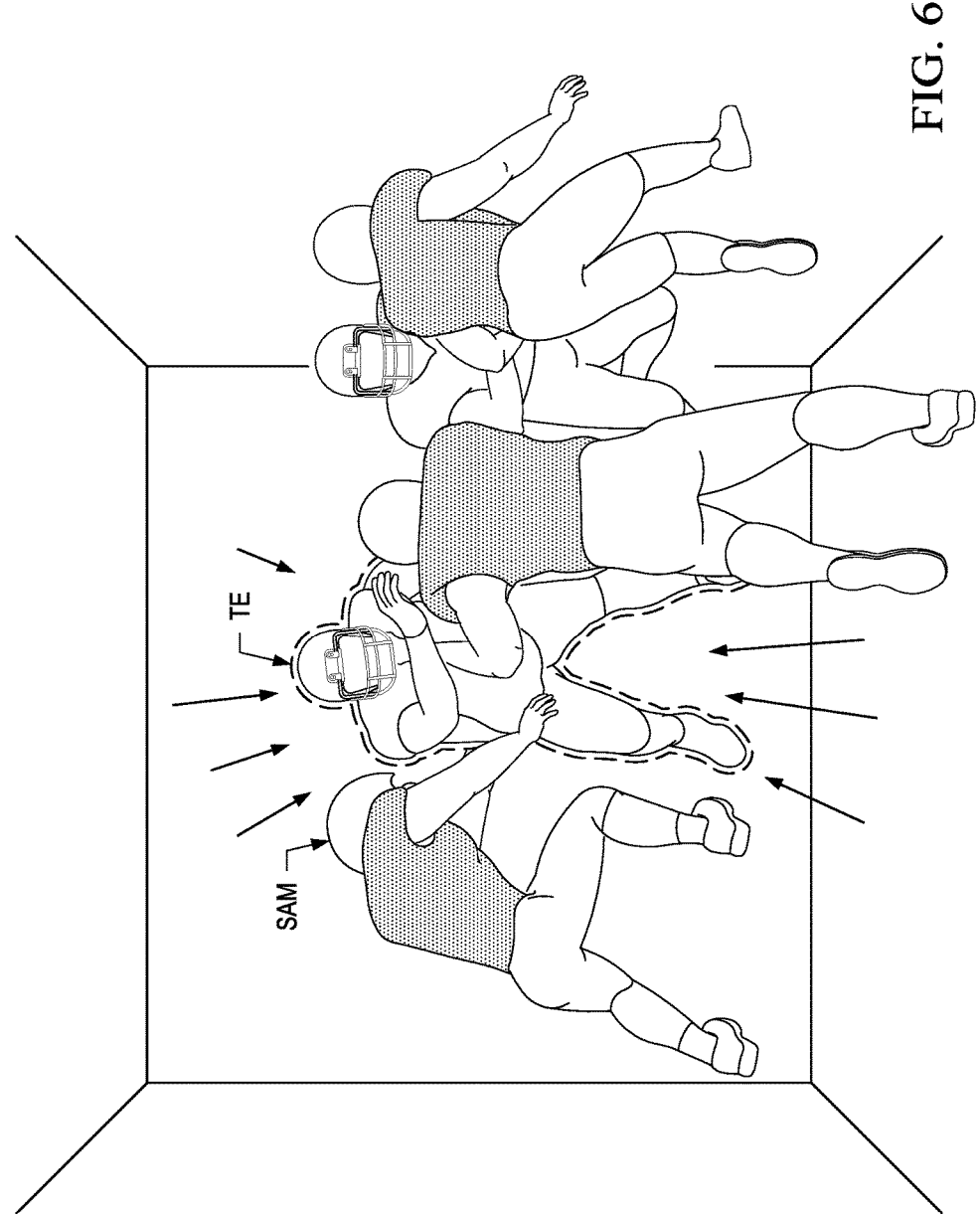

Coaches do not have enough time to dedicate a drill for every player, so the present invention can be used for all players regardless of their position or status in the depth chart to visualize, memorize and practice keys in their mind's eye, over and over. In the world of Psycho-Cybernetics, there is proof that the mind cannot distinguish between actual occurrences and vivid imaginary ones. For example, a "key" can be visualized by imagining the Tight End blocking down, or releasing for a pass, or faking a block and then releasing. The discipline of repeating the keys in the player's mind's eye (visualizing them rather than actually experiencing the play on the field) is important in the maturation as a defensive player. As shown in FIGS. 4-6, an example of a key on a tight end (TE) is illustrated. The Strong Side Linebacker ("Sam") slightly bent over, hands up, ready to jar the TE if he released onto the linebacker in an attempt to hook him for an end run. The Sam was aligned on the outside shoulder of the Tight End. The Tight End was down, in a three-point stance. As was the Offensive Tackle aligned next to the TE. The Defensive End was usually in a three-point stance aligned on the outside shoulder of the Offensive tackle. The Defensive Tackle was usually in a four-point stance, head up on the guard, two yards off the ball in a "Flex" position, poised to go through his reads prior to executing his responsibility. The Offensive Guard was also in the player's viewfinder. But that was it. Offensive formation was recognized but when keying the TE, back flow did not influence what the player was to do. Visualizing and recording the three basic moves the Tight End could do, each action resulting in new outcome prevents the player from being false keyed. CorneaCAM can train the player to always make the correct move based on what TL's defense needed.

The "Reel Coaching Video" can train players to perform their job flawlessly without the risk of injury. Any position can benefit by utilizing this concept, but the QB will benefit the most from the view of the CorneaCAM and immediately recognize its benefits. The present invention provides a precise learning tool that incorporates such an intense live game day experience from the site line of the QB's eyes.

The reason that only QB's and their coaches "get it" is because they are the only select group of athletes that genuinely know and understand exactly what the QB sees in the pocket, under heavy siege. Until you experience playing that position, you will never know what is truly being observed through the eyes of the QB. No other player, no other coach, no play-by-play announcer, no expert analyst and surely . . . no fans, ever get a real truth view of what the QB sees when he sets up in the pocket.

The QB does not have a clear view of anything past the massive bodies of his offensive linemen (OL) attempting to protect him from the massive bodies of onrushing defensive linemen (DL). His view or site line is never perfectly clear. It is always partially blocked, distorted and ever changing. He attempts to focus past those massive human blockades to observe the Linebackers (LB) and the Defensive backs (DB) as they scurry to their respective responsibilities, all the while striving to get a peak of his receivers so to evaluate the relationship they have with the defenders, as they run their routes. It is controlled chaos. Right decisions have to be made in 3.8 seconds, or the protection will soon collapse.

This recording the visual history of exactly what the QB sees when he settles into the pocket on a passing play is the essence of "Reel Coaching Video". It is imperative that the camera origin is exactly at the level of the QB's eyes . . . as if he had a camera in his cornea ("Cornea CAM").

Creating videos of actual pass plays in game (live) situations, with the origin of the camera on the actual site line of the players' eyes is a revolutionary and novel concept that has been proven to be a tremendously successful teaching tool, for any player, especially the QB. This video is potentially worth 1000 repetitions.

Every defense disguises its intentions prior to the snap and then after the snap, the defense completely changes what it originally showed. On a pass, after the snap, a QB must go through his progressions to determine which receiver should be his primary target. A "real truth read" by the QB is imperative in order to determine where he is to throw the ball or "should throw" the ball. This is what all QBs do, they make decisions, they must read the defense properly, under fire, in order to decide who best to target the pass.

Now . . . there is a way to get these precious repetitions and reads. A new process of training players on what they focus their eyes on has been created in order to put the player, in this case, the QB, into the fire without taking a chance of getting burned. "Reel Coaching Video" can work for any player—but best utilized for the QB.

"Reel Coaching Video"is what it implies: It is the real 3-Dimensional View from the eye of the player ("Cornea CAM"—"CC"), in this case, the QB. The video is recorded through the eye of the QB at his eye level. From the QB's sight-line, he scans the defense for the real truth of the pre-snap read as he comes under the center or moves back to the shotgun position. The QB can get true repetitions by viewing the visions projected on the screen as seen by the eyes of the QB as he scans the defense for certain keys that determine pre-snap and post-snap reads.

Figure 1:
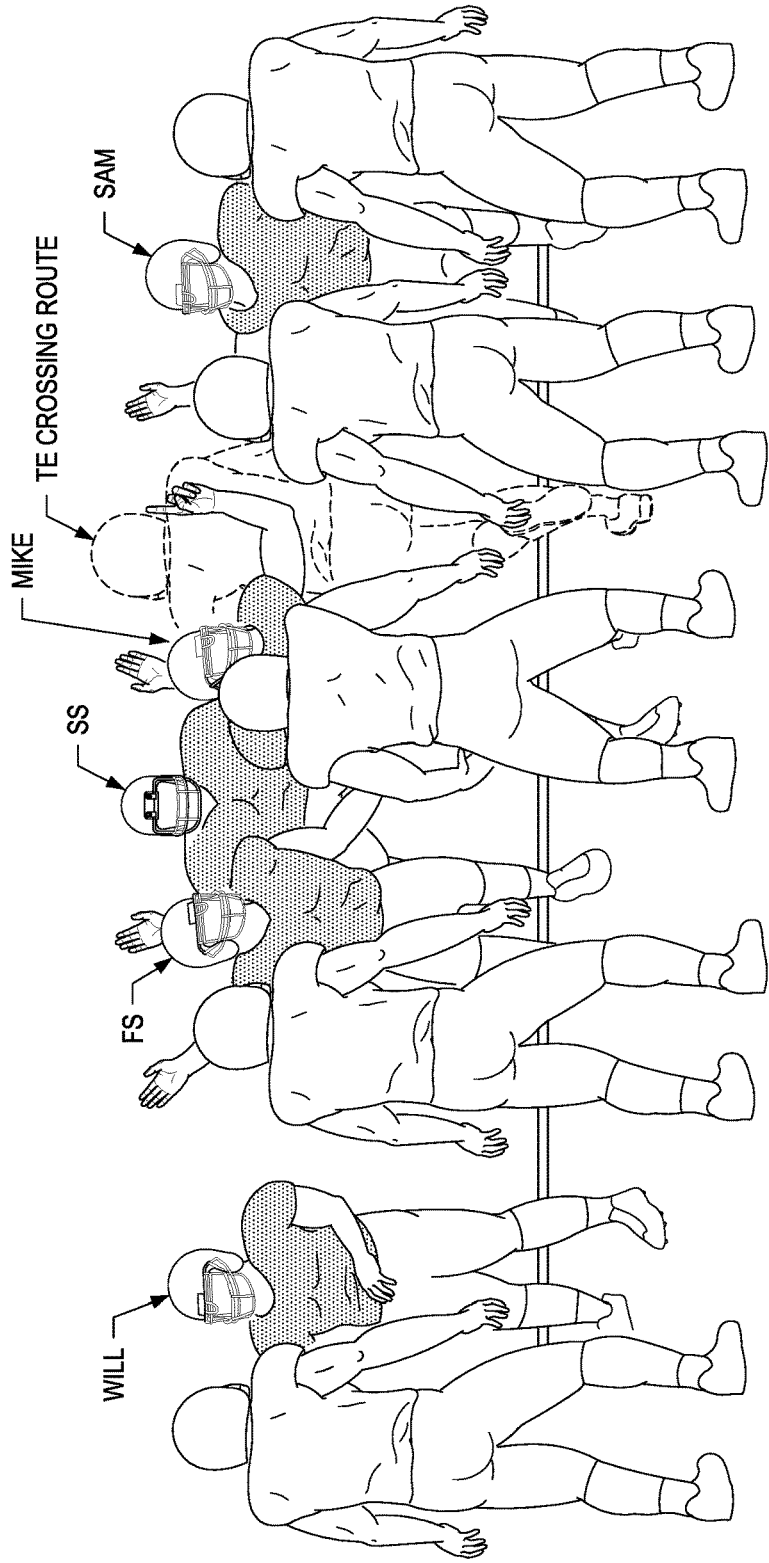
FIGS. 1-3 illustrate three points of view of a football in accordance with one embodiment of the present invention.

After the snap, the "Reel Coaching Video" scans the defense further at the QB's eye level ("CC") as the defensive linemen rush the QB with offensive linemen protecting. On the second level, the LB'ers and DB's are busy moving into their true coverage, as they no longer can waste time disguising intentions. This is when the QB goes through his "progression of reads" based on positions established by the defensive LB'ers and secondary. Each position dictates to the QB who should be the primary receiver. It is just as if the QB is actually scanning the defense himself as the eyes of the Cornea Cam move in the same directions. It is in 3-dimensional video of true on-field-action. (See FIG. 1).

The QB can get necessary repetitions without the risk of getting hit or hurt. The QB can get his progressions and determine where the ball should be thrown without taking the risk of getting hit by onrushing linemen and LB'ers.

See it in your mind's eye as a "flight simulator" that our military has used to train pilots under combat conditions for decades. It's what the pilot (or QB) truly sees at field level . . . not an aerial view. It's the real truth view . . . just like a pilot.

Figure 2:
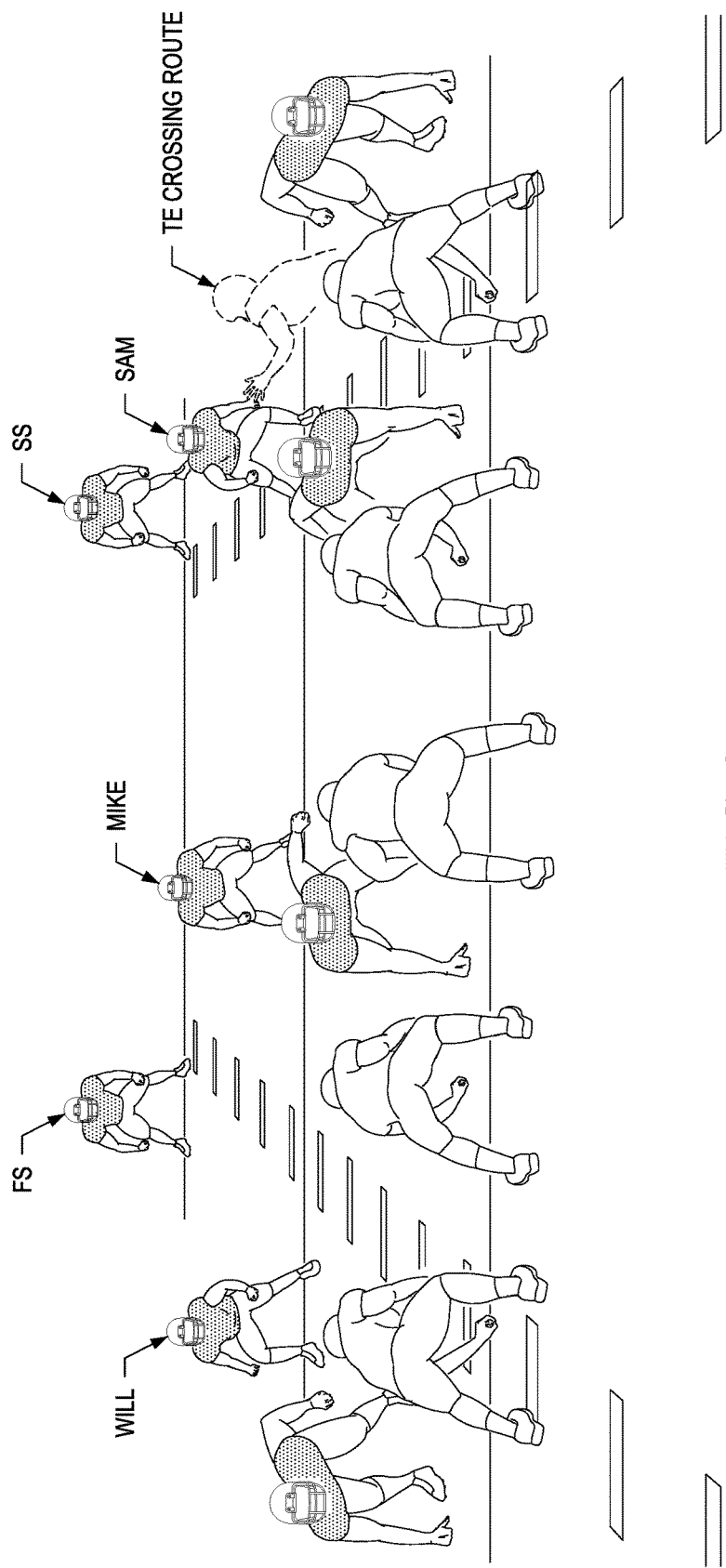
Figure 3:
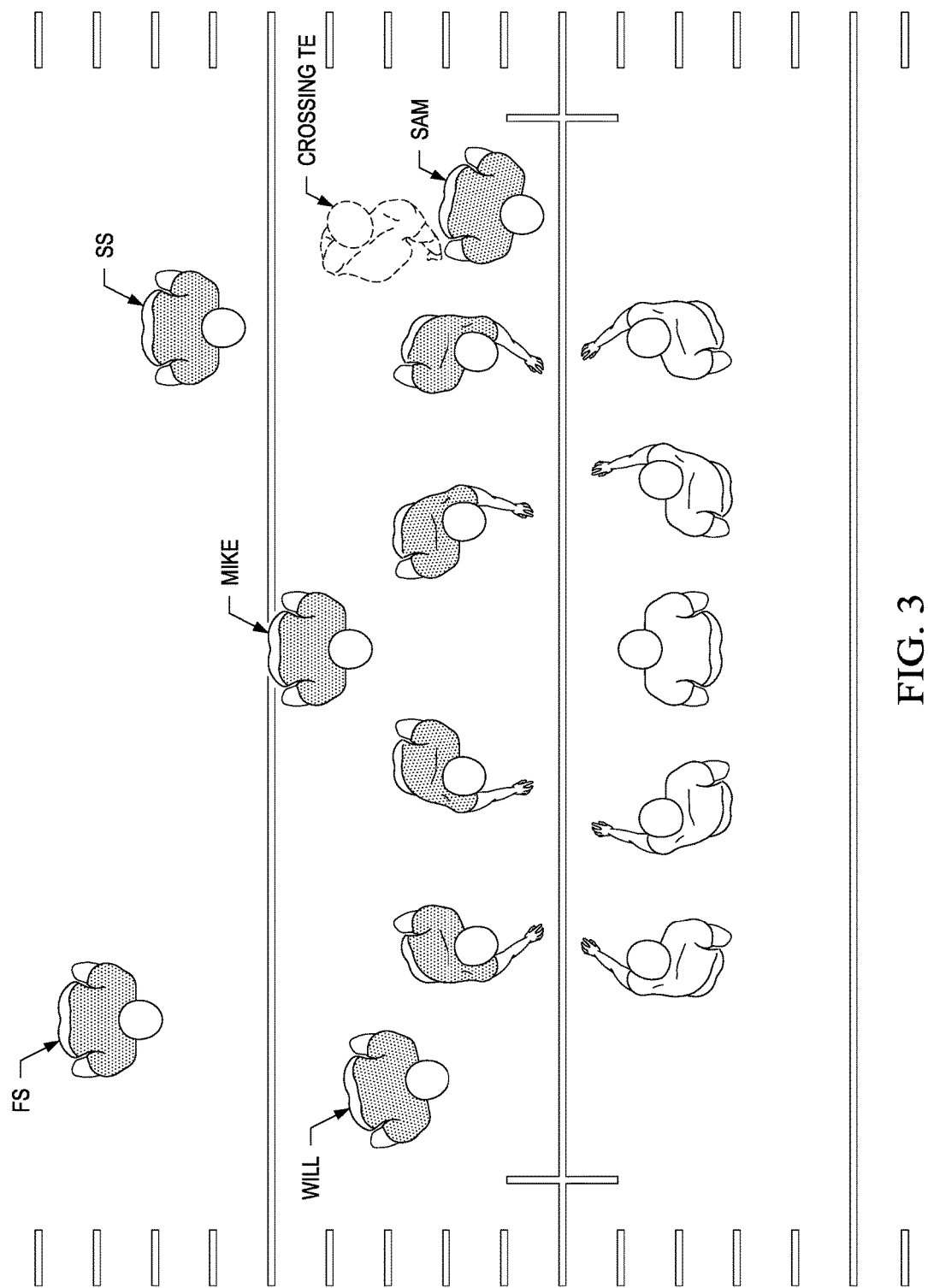

Slow motion, freeze and replay, all standard functions of film study are offered along with an option to "roll" the video up to a bird's eye view (360 degrees) (See FIGS. 2, 3) offering confirmation to the QB as to his reads and decision making.

Nothing replaces actually experiencing all out full speed combat, but "Reel Coaching Video" via "Cornea CAM", is the absolute next best vehicle.

Building a product that is as tell-tale as "Reel Coaching Video" needs to be, insists and demands that there will be no compromise. It is absolutely imperative that the point of view of the finished product is to be from the sight line of the QB . . . what he really sees in live game situations. Not from behind him or above him, but from what he sees as if his view from his eyes is being recorded by a camera—CorneaCAM. A practical methodology to secure a video from the sight line of the QB would be to just secure a Go-Pro Camera ("Facemask Camera") or some facsimile onto the forehead of the QB's helmet and roll tape. The challenge of securing an exact finished product comes in striving to execute a series of plays that are not "bouncy" or "shaking" so much that the QB gets nothing out of the recording, except a headache. All video I have seen that were produced with that methodology, is impossible to truly see or to focus on anything of consequence, thus it's far from teaching the QB what he should be looking at. In my mind, the POV needs to be smooth, not jerky, and be all encompassing, taking in the full field of vision the QB sees. "Rack focus" techniques need to be applied while filming the field of vision. Focus should never be on the offensive and defensive linemen. Though obvious distractions and site-line obstructions, it's imperative that the QB never concerns himself with the violent nature possessed by onrushing defensive linemen. Yes, they, along with his OL protecting him, are there and they are blocking the QB's view of what he would like to see, but those mountains of men are out of focus and, yes, they are a huge distraction. Whatever makes up all areas behind the Linemen, is what is important. Those second and third levels of fields of vision are in sharp focus (rack focus). This area is populated with the LB'ers and DB's executing their respective defensive assignment along with the receivers maneuvering into their planned routes. (See FIG. 1).

CorneaCAM ("CC") POV can be accomplished in two ways:

First, ORCHESTRATED COREOGRAPHED LIVE ACTION with a defensive "scout" team trained to simulate various pass defense coverages against various routes, filmed by a camera mounted on a dolly at the QB position, at 6'3" height, also at Cable Cam/Step Ladder position, 3' behind and 10' above the CorneaCam, secured by a cable or a stationary step-ladder, and a fixed stationary all-22 position from high above the stadium. (See FIGS. 7, 8, 9, 10).

This product would be more of a generic training video for a young QB. It would consist of four basic pass defenses that every defensive team runs coupled with four basic pass routes that every offensive team runs. This production would be the foundation training for a QB to learn before he takes on game plans and advanced scouting of next opponent video.

Note: With high speed offensive attacks, rarely can a defense play more than two coverages because of the problem the fast paced offense creates, so the four defensive package is flexible.

Second, ANIMATION created from interpolation of two taped camera angles of actual game film.

This product would be much more sophisticated than #1, as it would provide video of the next opponent. Once the season starts, players must study the "next opponent's" attack each week. Rather than staging a scout team to video defensive schemes, we will pull NFL/NCAA tapes of three games of the next opponent. The four pass defenses that are used the most in similar situations will be incorporated into the defensive video. In order to get the CorneaCAM POV, the animators will build the correct angle and sight line of the QB by interpolation of the actual angles from past games. This product is to be developed after #1 is perfected and brought to market.

Though challenging to produce a new study every week, there will come a time when this "next opponent" will be part of standard preparation for the QB.

Orchestra Ted Coreographed Live Action

WHAT: Film a predetermined set amount of pass plays executed by your offensive team and defensed by a scout defensive team that is prolific at mimicking the other team's defensive schemes, consisting of two basic coverages. The "dummy defensive team" would learn the disguises, techniques and tendencies of the two defensive schemes consistent with a familiar opponent that is always on the schedule. (division/conference rival). The offense would run four (arbitrary) pass patterns versus the two defenses, for a total of eight plays. Each defense would dictate to the QB and the route runners which receiver should be the most logical target based on the specific coverage.

HOW: (See FIGS. 8A-8B) Mount a high speed camera (CorneaCAM) on a dolly at a height of 6' 3" (avg. ht. NFL QB) to replace the QB's eyes. (See POV #1 & POV #1a.) Roll camera. Orchestrate a defensive disguise prior to the snap. Have the QB ("CC") scan the defense by rotating the camera side to side as he sees it from the shot-gun alignment, observing the pre-snap alignment all of the defenders are in. The QB ("CC") finds and identifies the Mike LB'er. He then activates the center by his cadence and hand position. The snap fires back to him (the dolly), the camera focuses on the ball as it spirals back to a chest high level. Just as the ball gets to the QB, he then focuses his eyes ("CC") first on the free safety "FS" as he usually dictates (gives away) the coverage first. The FS can only disguise so long then he, and all of the defensive backs and LB'ers, must take care of their respective responsibilities. No more disguises. The "CC" then scans the defense as controlled by the eyes of the QB, the defense is determined, so the QB knows the routes that are to be run, he then can freeze the frame and point out who is the best receiver to throw the ball to.

OPTIONS: Incorporating the ability to film the play in slow motion will provide an additional learning tool for the QB viewing the video. This POV is exactly what the QB sees while in the pocket. Maybe initially, the play is moving too fast for him to see the positions each defensive player is in and where his receivers are, in order for him to make the right decision. This problem accurately describes the dilemma most young QB's experience when first being exposed to live full speed action. After exposing the QB to the video in real time, he will have the ability to replay the action, but in slow motion. This will provide a comforting confirmation for the viewer (QB) as to what he is seeing. It is proven that new material if exposed to the student in slow motion, there is a tendency to comprehend more information more thoroughly. Thus, having studied the defense and the routes for several repetitions at a comfortable pace of slow motion, he is more competent when the play is run at real time speed. All three camera POV's (CorneaCAM, Cable Cam/Ladder Cam & All-22) are available as well, for any moment during the execution of the pass route. Because all three camera are filming the same "staged" play, the user (QB) can freeze and roll the POV up to the Cable Cam/Ladder Cam and what he will see is the same moment he was seeing from the CoreneaCAM POV. The three cameras are synchronous, and in real time they match the same moments whenever the QB wants to get a confirmation of what he "thinks" he sees.

POV #1: Cornea Cam—Eye Level Average Height NFL QB—75".
  Stationary/fixed Camera replaces the QB
  Capability to swing right and left
  Film/video high speed
  Capability for slow motion and freeze frame TEACHING: This is a premise that all coaches incorporate as the coach attempts to teach a player a new technique. Take for instance, teaching a young, raw talented defensive end a new technique of pass rushing vs. an offensive tackle. First, you build his confidence by teaching him one basic move. Allow him to "feel" the orchestrated movement by showing him the technique in physical slow motion, so he can feel what is expected from him. Repeat the slow motion move over and over until it's wrote memory, then, let him physically experience the technique in real time. Once that first move is taught and "driven home" to him, it provides a basis for moving into variations off that basic move. Teaching is about creating confidence in the player that he can and will master a technique. Slow and basic at first, then gradually allow the player to speed up the action at his comfortable pace. Confidence exudes from the player once he has conquered one specific and basic technique. That provides a foundation for a coach to teach off of A young player must master the absolute basic technique far in advance of striving to become exotic. From that basic move, grows variations that are soon developed by exposing the player to more and more techniques off the basic foundation. "Major" in one real solid form, or technique, and from that, "minor" in several variations off the first major technique. A good coach always starts by teaching a player to experience the technique by repeating it over and over to him in slow motion. Confidence grows fast when the player is taught slowly.

This coaching technique is the same concept needed to be incorporated into the video filmed and studied by the QB who is viewing the POV filmed by the CorneaCAM. It absolutely needs to be filmed with the capability of watching it over and over in slow motion, in order to build the confidence in the QB to interpret and calculate what he is actually seeing in real time. Freeze frame is yet another feature that is an absolute necessity, as confirmation builds confidence, that the QB is seeing what he thinks he is seeing.

Along with slow-motion and freeze frame, the QB needs to have the capability to roll the camera up above the action to the POV of the cable camera/step ladder camera situated about 6 feet above and 2 to 4 ft behind the QB (see POV#2, POV 2 a & POV 2 b) as well as the All-22 from atop of the stadium (see POV#3). Slow motion and freeze frame is necessary from these POV's as well. Once again, confirmation is a confidence builder for any progressing player. This will provide a vote of confidence that the QB is in fact seeing what he thinks he is seeing, but the clear view is blocked by the OL and DL.

Studies have proven that 65% of the population learn by visualization or seeing an action. A picture is worth a 1000 words. Not only is this concept the best way to retain information but the coach is assured that the CorneaCAM player (QB or SS or FS) will train his eyes to look at the correct key or "read". Coaches never know what players really look at. This is an assurance the player will be looking at the correct defender in order to trigger the correct execution of the play.

POV #2: Cable Cam or Step Ladder Cam—16'
  Stationary/fixed Camera 3' behind Cornea Cam
  Capability to swing right and left
  Film/video high speed
  Capability for slow motion and freeze frame.

Figure 7:
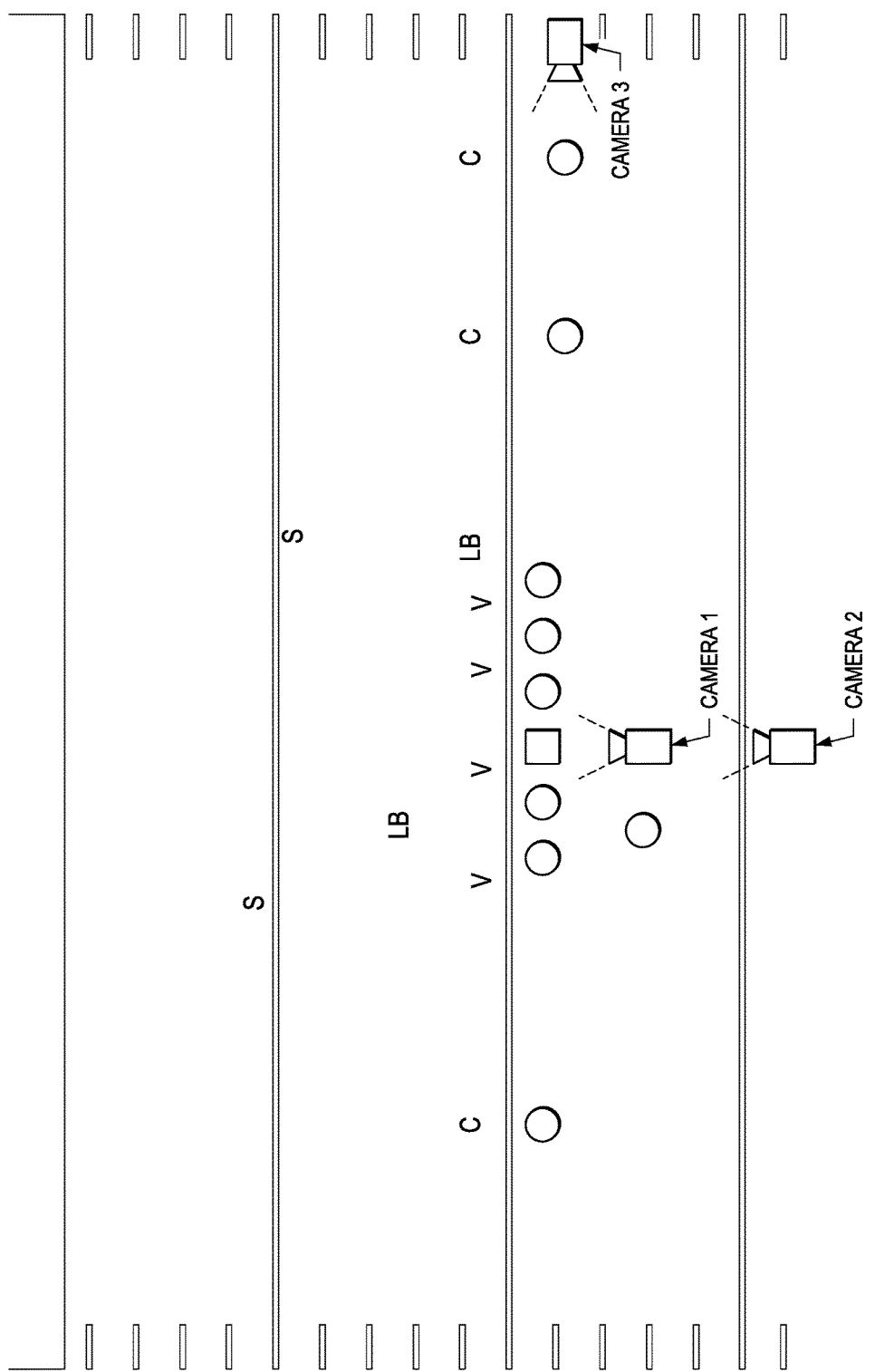
FIG. 7 illustrates the positions of all three cameras in accordance with one embodiment of the present invention.
Figure 8A:
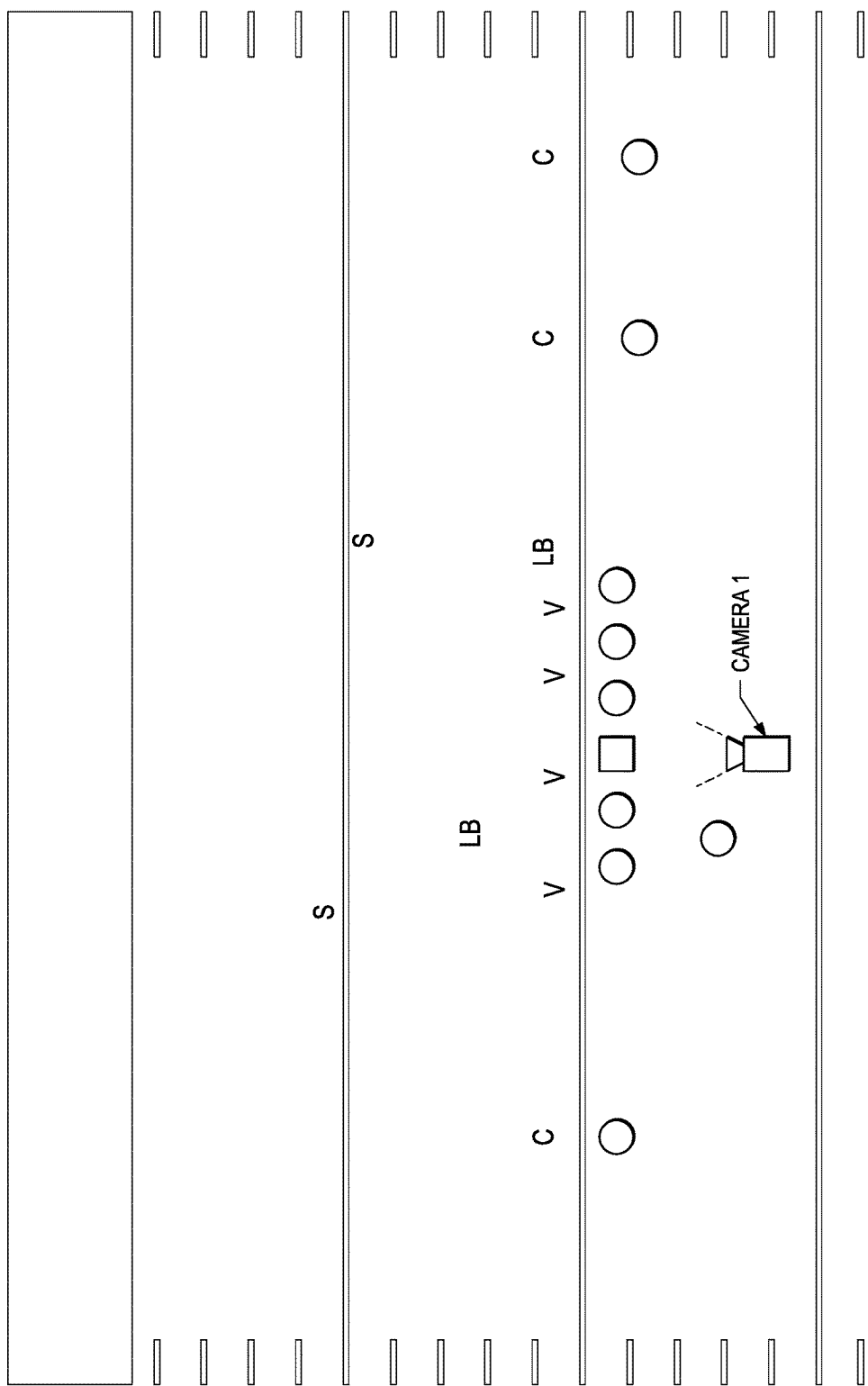
FIGS. 8A-8B illustrate a first point of view using a first camera in accordance with one embodiment of the present invention.
Figure 8B:
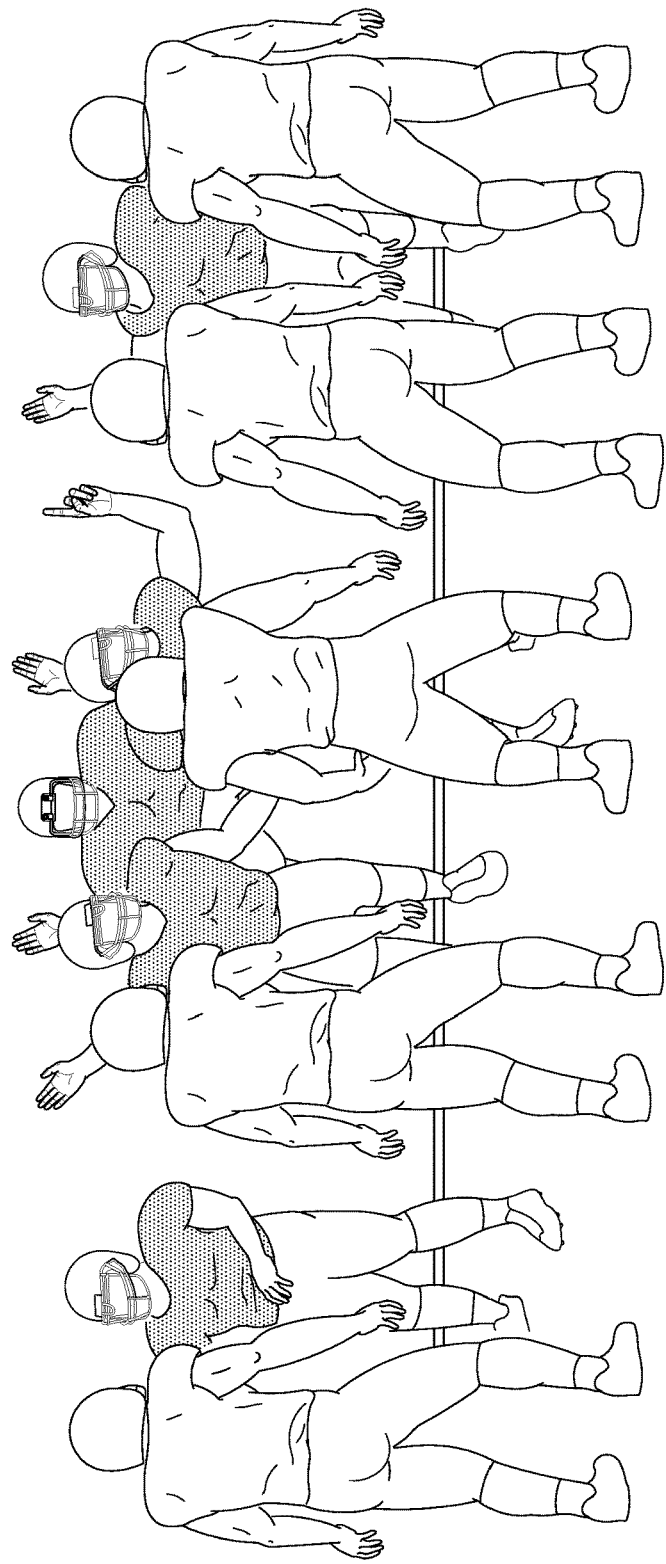
Figure 9A:
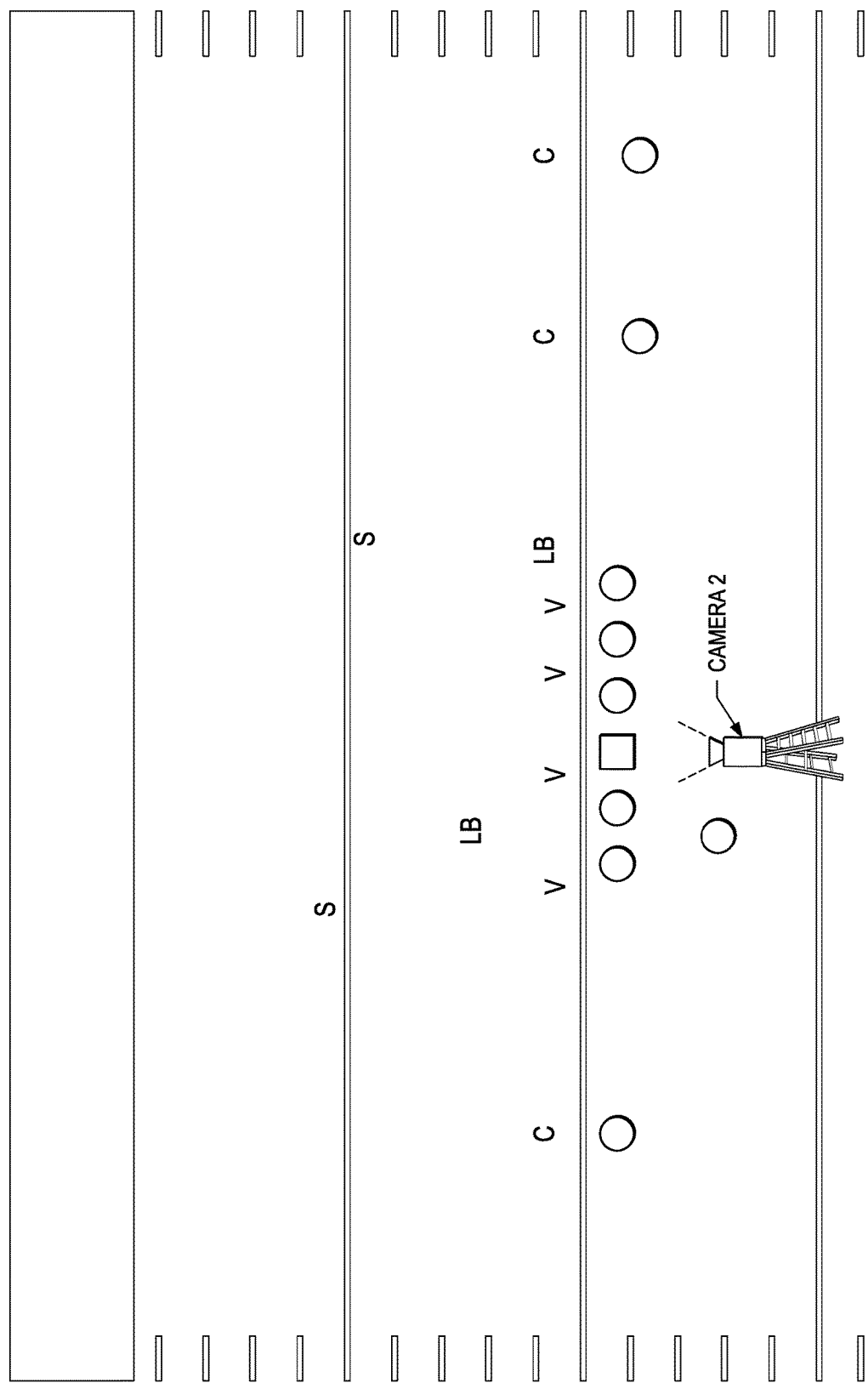
FIGS. 9A-9C illustrate a second point of view using a second camera in accordance with one embodiment of the present invention.
Figure 9B:
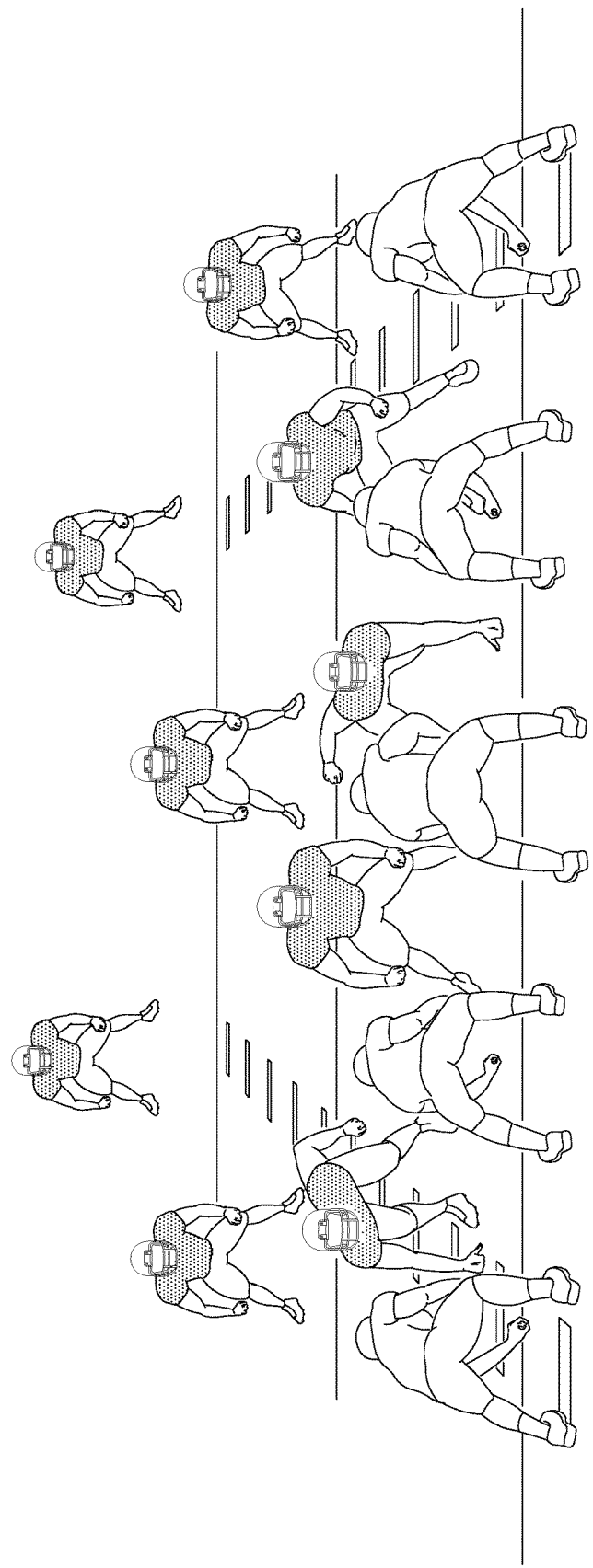
Figure 9C:
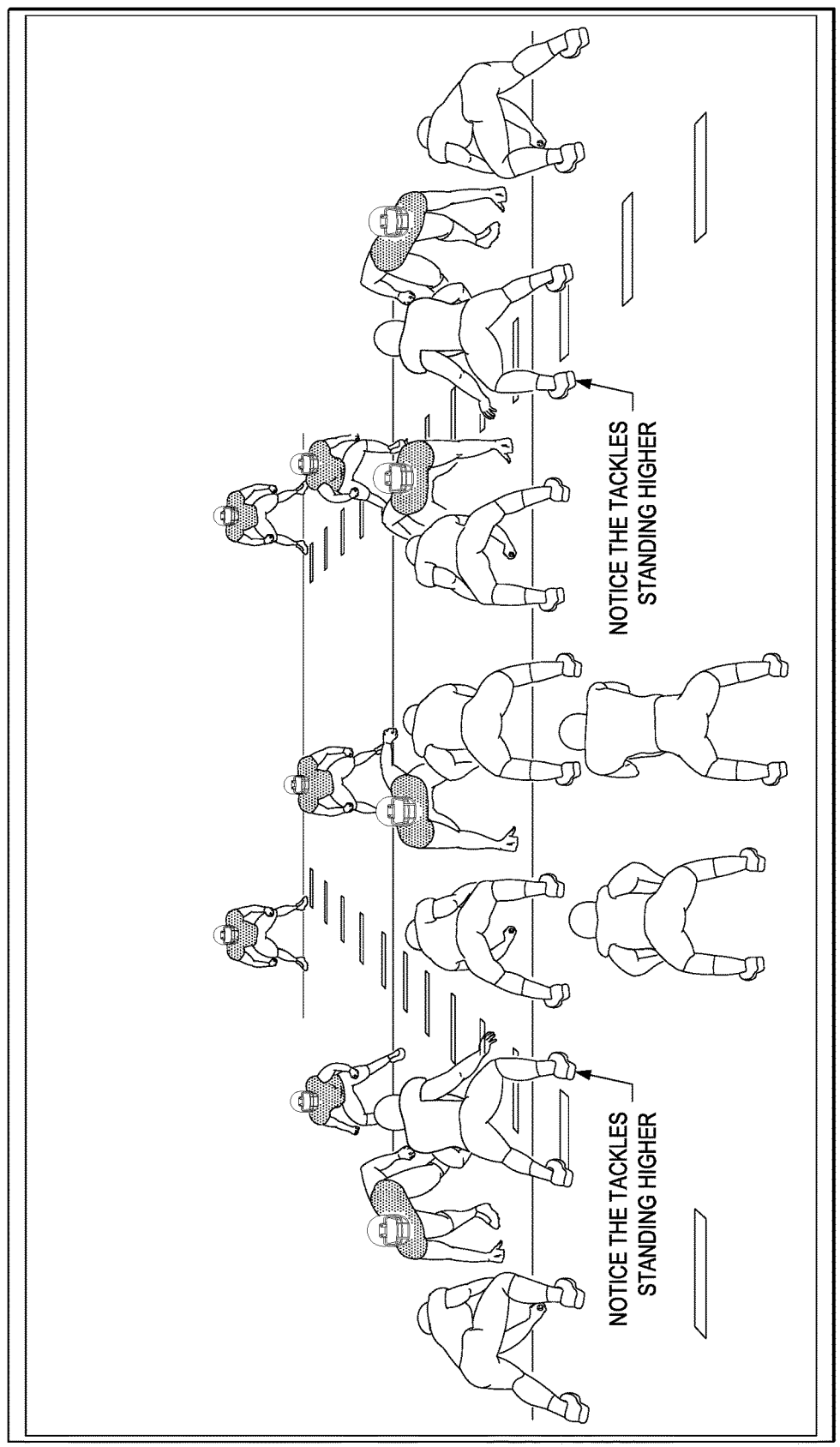
Figure 10:
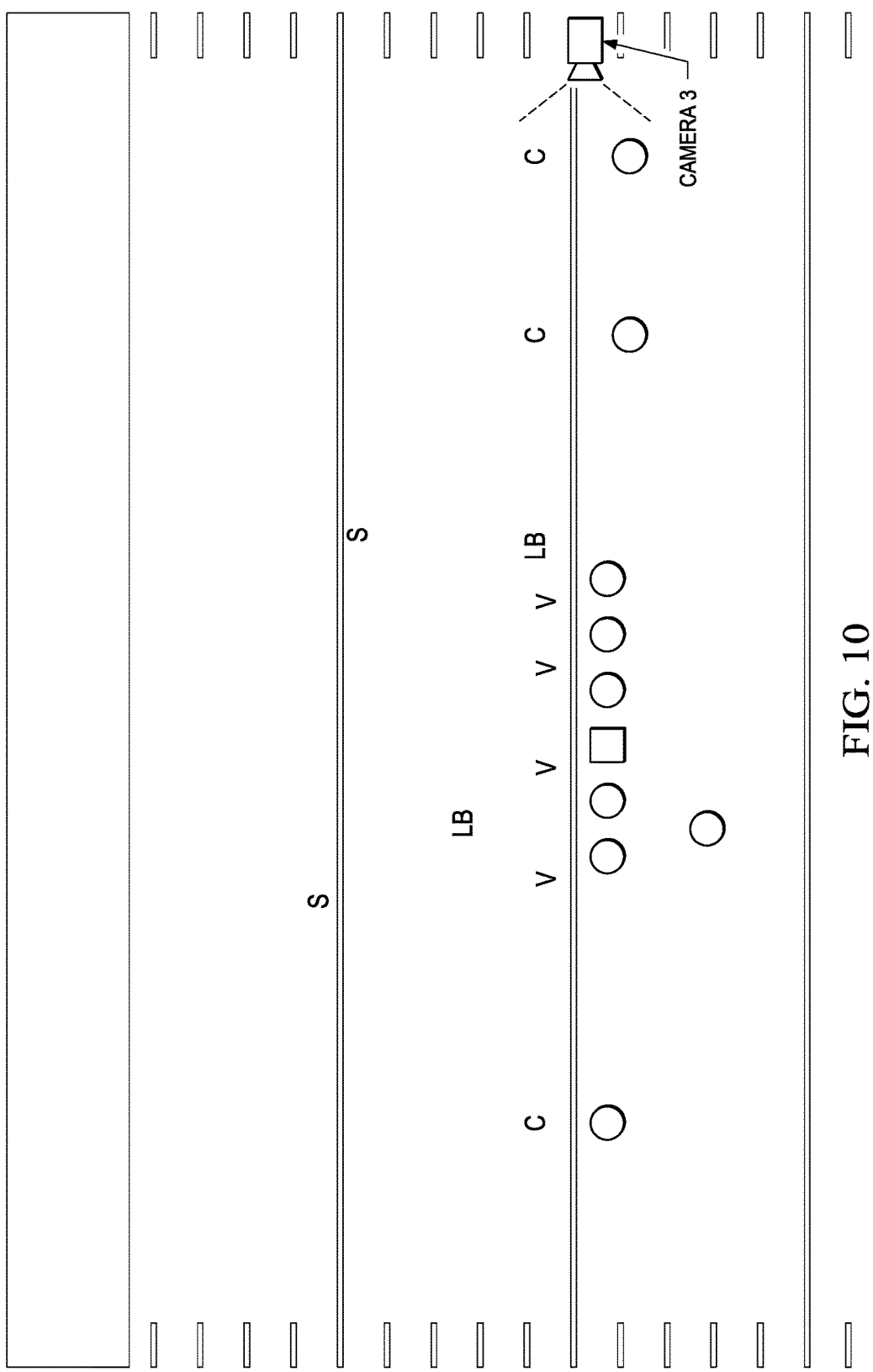
FIG. 10 illustrates a third point of view using a third camera in accordance with one embodiment of the present invention.

POV #3: Wide Angle SOL—"All 22 players"
Stationary/fixed Camera 50 yd line Top of Stadium
Film/video high speed
Capability for slow motion & freeze frame.
The camera positions in FIG. 7 are as follows:
Camera 1: 6'3" Height—Stationary Camera (replaces QB w/"Cornea Cam")
Camera 2: 8' Behind Camera 1—16' Height (Cable Cam or Stationary Step-Ladder Cam)
Camera 3: Top of Stadium—Wide Angle SDL (All-22 View).
FIGS. 8A and 8B illustrate POV #1:
Cornea Cam—Eye Level' Average Height NFL QB—75"
Stationary/fixed Camera replaces the QB
Capability to swing right and left
Film/video high speed
Capability for slow motion & freeze frame.
FIGS. 9A, 9B and 9C illustrate POV #2:
Cable Cam or Step Ladder Cam—16'
Stationary/fixed Camera 3' behind Cornea Cam
Capability to swing right and left
Film/video high speed
Capability for slow motion and freeze frame.
FIG. 10 illustrates POV #3:
Wide Angle SOL—"All 22"
Stationary/fixed Camera 50 yard line Top of Stadium
Film/video high speed
Capability for slow motion and freeze frame.

Figure 11:
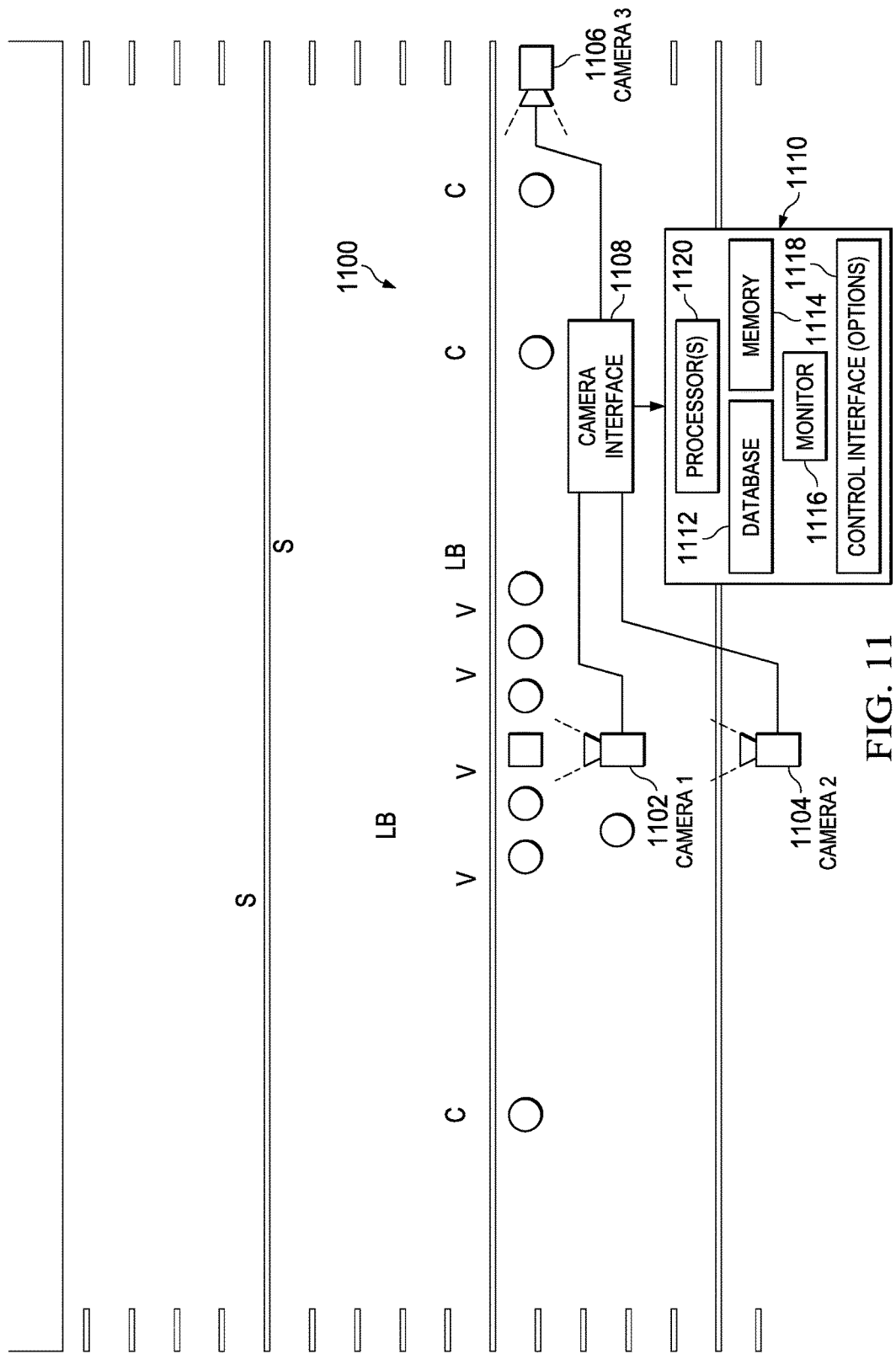
FIG. 11 illustrates a system in accordance with one embodiment of the present invention.

Referring to FIG. 11, a system 1100 in accordance with one embodiment of the present invention is shown. The system 1100 includes: a first camera 1102 positioned approximately at any eye level of a player of interest at a sports venue representing a player point of view; a second camera 1104 positioned approximately above and behind the first camera representing an elevated player point of view; a third camera 1106 positioned approximately above and to a side of the sports venue representing a wide angle view of all players; a camera interface 1108 communicably coupled to the first camera 1102, the second camera 1104 and the third camera 1106; and a computer 1110 communicably coupled to the camera interface 1108. The computer 1110 comprises a database 1112, a memory 1114, a monitor 1116 and a control interface 1118 communicably coupled to a processor 1120. The processor 1120 receives a first video from the first camera 1102, a second video from the second camera 1104 and a third video from the third camera 1106 via the camera interface 1108, and records the first video, the second video and the third video onto a non-transitory recording media.

The processor 1120 can synchronize the first video, the second video and the third video, and control the first camera 1102, the second camera 1104 and the third camera 1106 via the camera interface 1108. At least one of the first camera 1102, the second camera 1104 or the third camera 1106 can be wirelessly connected to the camera interface 1108. The camera interface 1108 can be integrated into the computer 1110. The first camera 1102 can be positioned approximately 75 inches high. The second camera 1104 can be approximately six feet above the first camera 1102 and approximately two to four feet behind the first camera 1102. The first camera 1102 can be rotatable to a right or a left of a first center position. The second camera 1104 can be rotatable to the right or the left of a second center position. The sports venue can be at least one of a football field, a basketball court, a baseball field, a hockey rink, or a soccer field.

Figure 12:
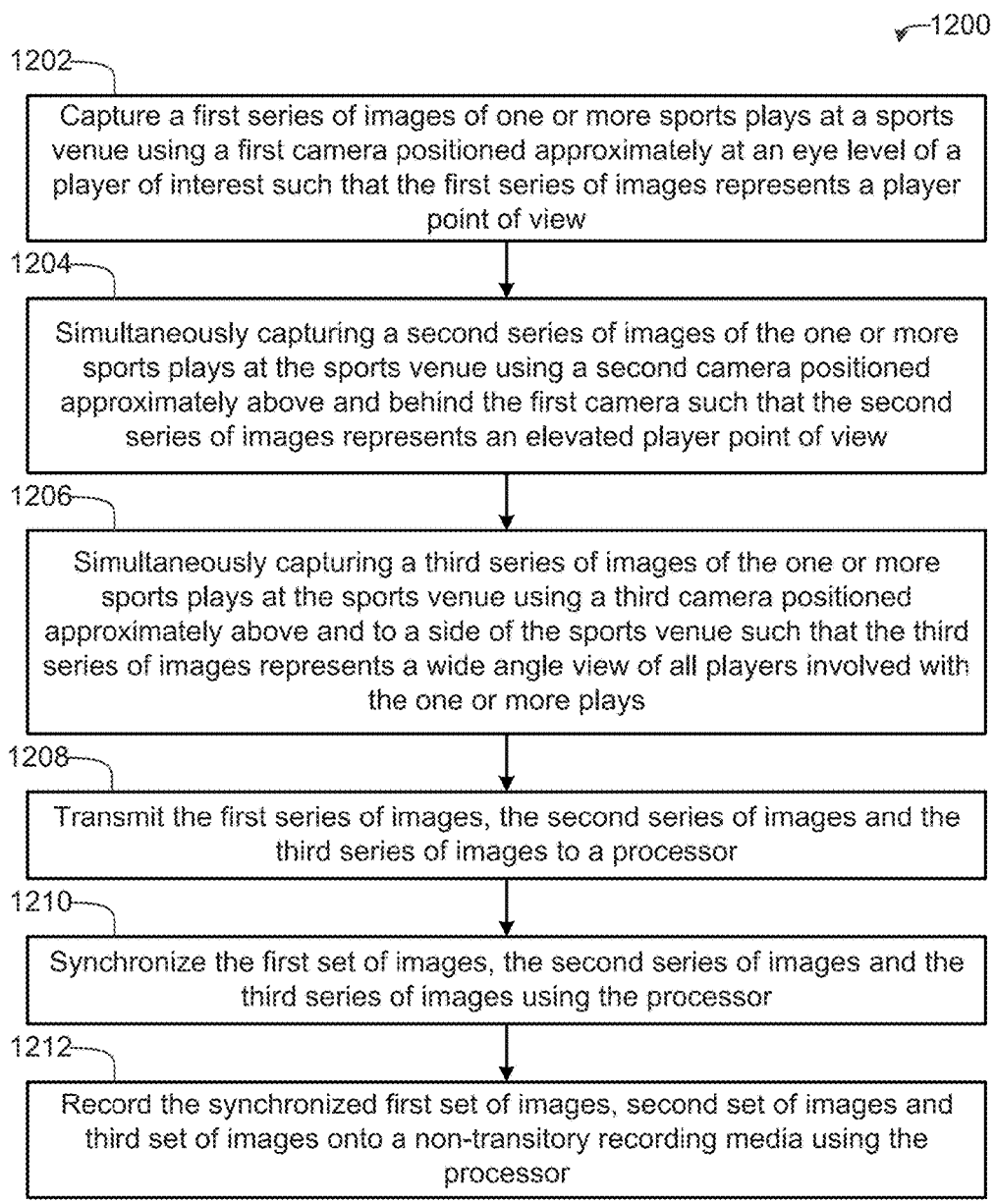
FIG. 12 is a flow chart of a method of recording one or more sports plays at a sports venue in accordance with one embodiment of the present invention.

Now referring to FIG. 12, a flow chart 1200 of a method of recording one or more sports plays at a sports venue in accordance with one embodiment of the present invention is shown. A first series of images of one or more sports plays at a sports venue are captured using a first camera positioned approximately at an eye level of a player of interest such that the first series of images represents a player point of view in block 1202. A second series of images of the one or more sports plays at the sports venue are simultaneously captured using a second camera positioned approximately above and behind the first camera such that the second series of images represents an elevated player point of view in block 1204. A third series of images of the one or more sports plays at the sports venue are simultaneously captured using a third camera positioned approximately above and to a side of the sports venue such that the third series of images represents a wide angle view of all players involved with the one or more plays in block 1206. The first series of images, the second series of images and the third series of images are transferred to a processor in block 1208. The first set of images, the second series of images and the third series of images are synchronized using the processor in block 1210. The synchronized first set of images, second set of images and third set of images are recorded onto a non-transitory recording media using the processor in block 1212.

Other steps may include positioning the first camera, the second camera and the third camera, selectively pausing a selected play, and/or reviewing the selected play frame by frame.

Figure 13:
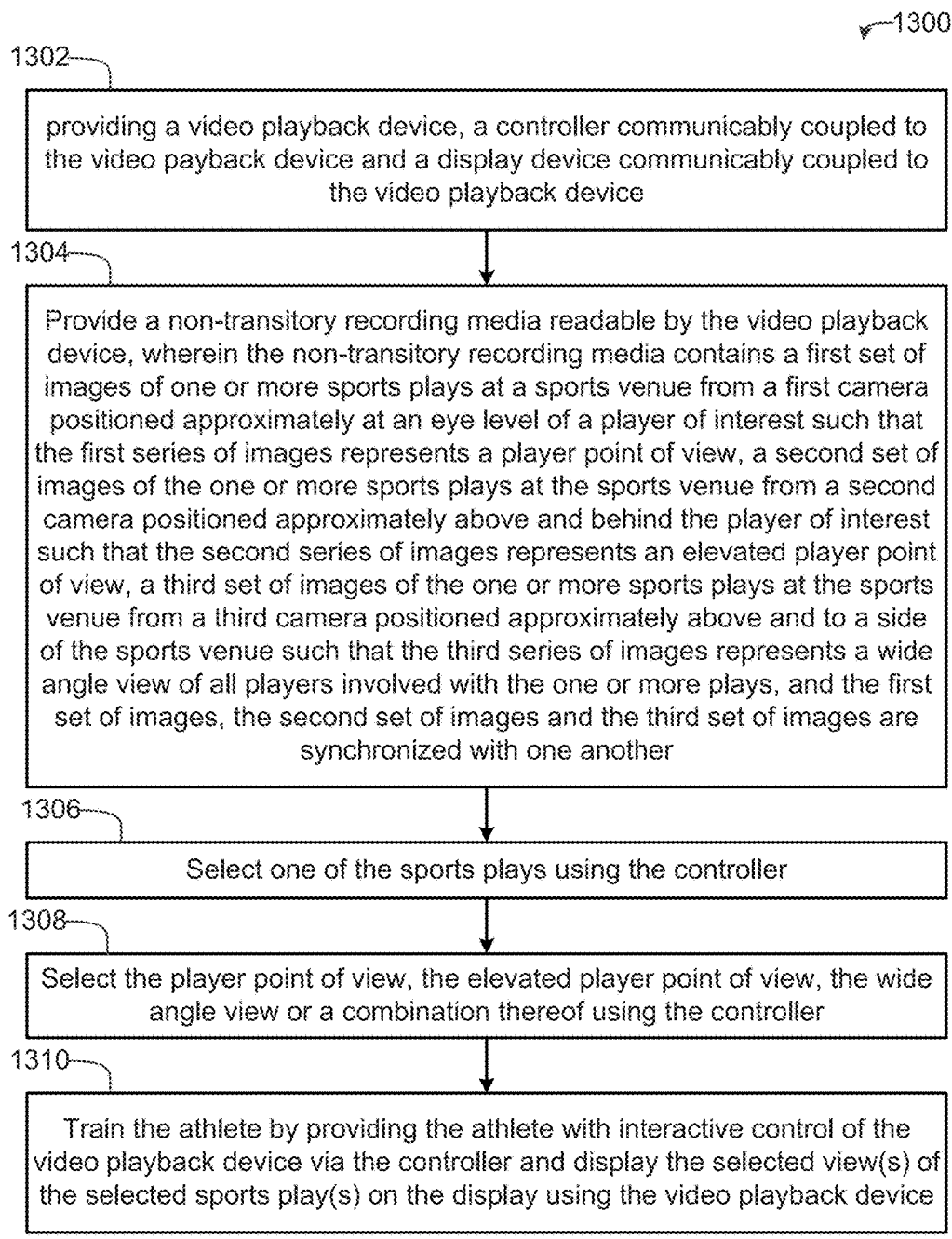
FIG. 13 is a flow chart of a method of recording training an athlete in accordance with one embodiment of the present invention.

Referring now to FIG. 13, a flow chart 1300 of a method of recording training an athlete in accordance with one embodiment of the present invention is shown. A video playback device, a controller communicably coupled to the video payback device and a display device communicably coupled to the video playback device are provided in block 1302. A non-transitory recording media readable by the video playback device is provided in block 1304. The non-transitory recording media contains a first set of images of one or more sports plays at a sports venue from a first camera positioned approximately at an eye level of a player of interest such that the first series of images represents a player point of view, a second set of images of the one or more sports plays at the sports venue from a second camera positioned approximately above and behind the player of interest such that the second series of images represents an elevated player point of view, a third set of images of the one or more sports plays at the sports venue from a third camera positioned approximately above and to a side of the sports venue such that the third series of images represents a wide angle view of all players involved with the one or more plays, and the first set of images, the second set of images and the third set of images are synchronized with one another. One of the sports plays are selected using the controller in block 1306. The player point of view, the elevated player point of view, the wide angle view or a combination thereof are selected using the controller in block 1308. The athlete is trained by providing the athlete with interactive control of the video playback device via the controller and displaying the selected view(s) of the selected sports play(s) on the display using the video playback device in block 1310.

Other steps may include switching between the first recording, the second recording or the third recording using the controller, reviewing the selected play frame by frame, pausing the selected play using the controller, displaying the second recording or the third recording or both along with the first recording on the display, rotating the first perspective right or left, rotating the second perspective right or left, and/or zooming in or zooming out within the first recording.

The display device can be a monitor, a television, a set of glasses, a set of goggles or a combination thereof. The controller can be a keyboard, a keypad, a mouse, a game controller, a voice activated controller, a motion activated controller or a combination thereof.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A sports recording system comprising:
    a first camera positioned approximately at any eye level of a player of interest at a sports venue representing a player point of view, wherein the first camera is stationary;
    a second camera positioned approximately above and behind the first camera representing an elevated player point of view, wherein the second camera is stationary;
    a third camera positioned approximately above and to a side of the sports venue representing a wide angle view of all players, wherein the third camera is stationary;
    a camera interface communicably coupled to the first camera, the second camera and the third camera;
    a computer communicably coupled to the camera interface, the computer comprising a database, a memory, a monitor and a control interface communicably coupled to a processor;
    wherein the processor receives a first video from the first camera, a second video from the second camera and a third video from the third camera via the camera interface, synchronizes the first video, the second video and the third video, and records the synchronized first video, the synchronized second video and the synchronized third video onto a non-transitory recording media; and
    wherein the first video includes a right, a left, and a first center position of the first camera such that the player point of view is rotatable.

2. The sports recording system as recited in claim 1, wherein the processor controls the first camera, the second camera and the third camera via the camera interface.

3. The sports recording system as recited in claim 1, wherein at least one of the first camera, the second camera or the third camera is wirelessly connected to the camera interface.

4. The sports recording system as recited in claim 1, wherein the camera interface is integrated into the computer.

5. The sports recording system as recited in claim 1, wherein:
    the first camera is positioned approximately 75 inches high; and
    the second camera is approximately six feet above the first camera and approximately two to four feet behind the first camera.

6. The sports recording system as recited in claim 1, wherein:
    the first camera is rotatable to the right or the left of the first center position; or
    the second camera is rotatable to the right or the left of a second center position.

7. The sports recording system as recited in claim 1, wherein the sports venue comprises at least one of a football field, a basketball court, a baseball field, a hockey rink, or a soccer field.

8. A method of recording one or more sports plays at a sports venue comprising the steps of:
    capturing a first series of images of one or more sports plays at a sports venue using a first camera positioned approximately at an eye level of a player of interest such that the first series of images represents a player point of view, wherein the first camera is stationary and the first series of images includes a right, a left, and a first center position of the first camera such that the player point of view is rotatable;
    simultaneously capturing a second series of images of the one or more sports plays at the sports venue using a second camera positioned approximately above and behind the first camera such that the second series of images represents an elevated player point of view, wherein the second camera is stationary;
    simultaneously capturing a third series of images of the one or more sports plays at the sports venue using a third camera positioned approximately above and to a side of the sports venue such that the third series of images represents a wide angle view of all players involved with the one or more plays, wherein the third camera is stationary;
    transmitting the first series of images, the second series of images and the third series of images to a processor;
    synchronizing the first set of images, the second series of images and the third series of images using the processor; and
    recording the synchronized first set of images, second set of images and third set of images onto a non-transitory recording media using the processor.

9. The method as recited in claim 8, further comprising the step of positioning the first camera, the second camera and the third camera.

10. The method as recited in claim 8, further comprising the step of selectively pausing a selected play.

11. The method as recited in claim 10, further comprising the step of reviewing the selected play frame by frame.

12. A method of training an athlete comprising the steps of:

providing a video playback device, a controller communicably coupled to the video payback device and a display device communicably coupled to the video playback device;

providing a non-transitory recording media readable by the video playback device, wherein the non-transitory recording media contains a first set of images of one or more sports plays at a sports venue from a first stationary camera positioned approximately at an eye level of a player of interest such that the first series of images represents a player point of view comprising a right, a left, and a first center position of the first stationary camera such that the player point of view is rotatable, a second set of images of the one or more sports plays at the sports venue from a second stationary camera positioned approximately above and behind the player of interest such that the second series of images represents an elevated player point of view, a third set of images of the one or more sports plays at the sports venue from a third stationary camera positioned approximately above and to a side of the sports venue such that the third series of images represents a wide angle view of all players involved with the one or more plays, and the first set of images, the second set of images and the third set of images are synchronized with one another;

selecting one of the sports plays using the controller;

selecting the player point of view, the elevated player point of view, the wide angle view or a combination thereof using the controller; and training the athlete by providing the athlete with interactive control of the video playback device via the controller and displaying the selected view(s) of the selected sports play(s) on the display using the video playback device.

13. The method as recited in claim 12, further comprising the step of switching between the first recording, the second recording or the third recording using the controller.

14. The method as recited in claim 12, further comprising the step of reviewing the selected play frame by frame.

15. The method as recited in claim 12, further comprising the step of pausing the selected play using the controller.

16. The method as recited in claim 12, further comprising the step of displaying the second recording or the third recording or both along with the first recording on the display.

17. The method as recited in claim 12, further comprising the step of:
rotating the player point of view right or left; or
rotating the elevated player point of view right or left.

18. The method as recited in claim 12, further comprising the step of zooming in or zooming out within the first recording.

19. The method as recited in claim 12, wherein the display device comprises a monitor, a television, a set of glasses, a set of goggles or a combination thereof.

20. The method as recited in claim 12, wherein the controller comprises a keyboard, a keypad, a mouse, a game controller, a voice activated controller, a motion activated controller or a combination thereof.

* * * * *